United States Patent Office 3,445,439
Patented May 20, 1969

3,445,439
PROCESS FOR PRODUCING POLYVINYL
CARBAZOLE
Eric Haydn Cornish, London, England, assignor to International Standard Electric Corporation, New York, N.Y., a corporation of Delaware
No Drawing. Continuation of application Ser. No. 302,743, Aug. 16, 1963. This application Apr. 13, 1967, Ser. No. 630,533
Int. Cl. C08f 5/00, 45/50
U.S. Cl. 260—88.3                              6 Claims

ABSTRACT OF THE DISCLOSURE

Plasticised polyvinyl carbazole is produced at room temperatures by mixing vinyl carbazole monomer with a phenolic phosphate or phosphite to cause an exothermic reaction.

BACKGROUND OF THE INVENTION

Field of the invention

This invention relates to processes for polymerizing vinylcarbazole and particularly a novel process using a material which acts as a plasticizer and catalyst to produce the polyvinylcarbazole at normal room temperature.

The present application is a continuation of previous application Ser. No. 302,743, filed Aug. 16, 1963, and now abandoned.

Description of the prior art

Miniaturisation of components for use in the radio and radar fields, and the use of components in high temperature environments have necessitated an investigation of constructional materials having suitable mechanical, electrical and thermal properties. Considerable interest has been shown in polyvinylcarbazole because of its good electrical insulation properties combined with thermal resistance and stability. Such properties enable the substance to be used at temperatures in excess of those at which polystyrene and many other conventional insulating materials could be used.

It is known that vinylcarbazole can be thermally polymerised by either heating it alone for a considerably long period of time at a temperature above its melting point or by heating it in the presence of a catalyst. One such known process is an adiabatic bulk polymerisation, under a high pressure of inert gas, initiated by di-tert. butyl peroxide activated by 2:2′ - azobis - isobutyronitrile. Such known processes generally involve heating the vinylcarbazole monomer and the catalyst to temperatures of 100° C. or above for periods of several hours.

SUMMARY OF THE INVENTION

It is therefore an object of the present invention to provide an improved process for producing polymerised vinylcarbazole at normal room temperature.

According to the present invention there is provided a process for producing polyvinyl carbazole by mixing vinyl carbazole monomer with one or more of the classes of phenolic phosphates and/or phenolic phosphites. It has been discovered that these materials polymerise vinylcarbazole monomer when mixed therewith at normal room temperature. The phenolic phosphate or phosphite acts as a plasticiser in addition to acting as a catalyst.

DESCRIPTION OF THE PREFERRED EMBODIMENTS

Examples of materials which polymerize vinylcarbazole monomer are triethyl phenyl phosphate, tri (tolyl) phosphate, tri xylenyl phosphate, tri phenyl phosphite and tris nonyl phenyl phosphite which catalyze polymerization in increasing order of reactivity. The materials react with the monomer at various reaction speeds ranging from slow (20 minutes at room temperature) to very fast (charring in a few seconds). The phosphate and/or phosphite is preferably present in a proportion selected from the range of up to 70% by weight of the monomer, and more preferably in a proportion from 5 to 70% by weight of the monomer. In the case of adding tri tolyl phosphate, a paste forms which gels, generates an exotherm and then sets in a few minutes to a homogeneous mass of plasticised polyvinylcarbazole. The softening temperature and the flexibility of the polymer is dependent upon the amount of plasticiser used, the softening temperature being inversely proportional to the amount of plasticiser used. For 15% of tri tolyl phosphate the softening temperature is 140° C., for 20% of this substance the softening temperature is 130° C.; for up to 20% of the tri tolyl phosphate the polymer is brittle, but for increased percentages the flexibility of the polymer increases, all percentages referred to herein being percentages by weight.

The reaction may be carried out at room temperatures with all the catalysts. With the lower reactivity materials moderate warming accelerates the reaction considerably, approximately doubling the reaction rate for a 10° C. increase. For example, with lower amounts of tritolyl phosphate, e.g. 10%, the reaction may be speeded up by heating to 50° C., the reaction time taking 15 minutes for completion. The reaction is also accelerated by the addition of a small quantity (for example 0.1% by weight of monomer) of certain aromatic thiols such as thio-β-naphthol. Alternatively the reaction can be slowed down or stopped by adding a small quantity of amine or thio ketone, for example 0.5% by weight of N,N di-β-naphthyl p-phenylene diamine or of thio urea. Other sulfur compounds such as 1,1′ thio di-2-naphthol and diphenyl thio urea also inhibit the thermal polymerization of the vinylcarbazole. Yields of purified polymer ranging from 55 to 75% of the initial weight of vinylcarbazole have been obtained.

The method of polymerising the vinylcarbazole will now be described in greater detail with reference to the following examples.

Example 1.—10% by weight of tri tolyl phosphate when mixed with vinylcarbazole monomer produces an exothermic reaction. Solvent extraction and precipitation yielded 56% of homopolymer with a softening point of 233° C. and a K value (viscosity coefficient) of 22. The material was analysed as $C_{14}H_{12}N_{0.82}$ and tended to be brittle.

Example 2.—60% by weight of tri tolyl phosphate when mixed with vinylcarbazole again produced an exothermic reaction. There was a 60% yield of polymer with a softening point of 229° C. and K value of 20. The resin was quite flexible.

Example 3.—20% by weight of tri tolyl phosphate, 0.1% by weight of thio-β-naphthol and vinylcarbazole were mixed and a very rapid exotherm developed. There was tendency for charring to occur before uniform mixing could be achieved, the temperature reaching almost 300° C.

In these examples the materials produced were fractionated in benzene and precipitated by methanol to remove unreacted monomer and consequently yield the polymer.

As the purified polymers produced in accordance with the above were free of phosphorous and were analysed $C_{14}H_{11}N_{0.78-0.82}$, it seems that the tri tolyl phosphate has not entered directly into the polymerisation reaction, but has acted catalytically through or in conjunction with impurities present in it. This has been supported by the fact that tri tolyl phosphate of high purity did not react.

It is assumed that some impurity present in commercial grade tritolyl phosphate acts catalytically towards the vinylcarbazole. Infrared difference spectra of reactive and non-reactive forms of tri tolyl phosphate disclosed certain unidentified phenol type compounds and it has been found that addition of certain phenols and cresols to purified (unreactive) tri tolyl phosphate increased the catalytic effect. An equivalent amount of phosphoric acid to the free acid in tritolyl phosphate was used, but did not give a sufficiently high reaction rate.

Another proposed explanation is that since amine type materials inhibit the catalytic activity, it could be inferred that the pure tritolyl phosphate contains a nitrogeneous substance which inhibits catalysis, and air treatment destroys this material and thus permits catalysis to occur with commercial grade tri tolyl phosphate.

Similar considerations to this apply generally to the pure and commercial grades of the other phenolic phosphates and phosphites.

Examples of the use of phosphite materials follows:

Example 4.—Three parts by weight of vinylcarbazole monomer mixed with one part by weight of trisnonyl phenyl phosphite at 30° C. gave a fast exothermic reaction and charred resin.

Example 5.—Three parts by weight of vinylcarbazole monomer mixed with one part by weight of tri phenyl phosphite at room temperature gave an exothermic reaction and a yellow (charred) product.

Both examples utilize solid catalysts. Extraction and isolation of the polymer in each example was as for the three previous examples of phosphates. Cooling in these tests was uncontrolled and control would be necessary to prevent charring for commercial production.

Example 6.—With a 25% solution of trisnonyl phosphite in benzene using 3 parts by weight of vinylcarbazole monomer and 1 part by weight of solution, there was a rapid reaction at 80° C. Variation of the solution concentration in benzene from 20 to 50% gave reaction times from three minutes to 35 seconds respectively, with no controlled cooling and with temperatures rising to the boiling point of the mixture.

The electrical properties of the polyvinylcarbazole prepared in accordance with the present invention are substantially the same as the electrical properties of polyvinylcarbazole prepared in accordance with known methods. Known polyvinylcarbazole when used as a capacitor dielectric at 1.5 mc./s. has a dielectric constant of 3 and a loss angle of 0.001. The polymer prepared in accordance with the present invention has a permittivity of 2.8 and a loss angle of 0.001 at 1 mc./s., and a permittivity of 2.89 and a loss angle of 0.0025 at 45 mc./s.

It is to be understood that the foregoing description of specific examples of this invention is not to be considered as a limitation on its scope.

What is claimed is:

1. A process for producing polyvinyl carbazole by mixing vinylcarbazole monomer with a phenolic material of the group consisting of phenolic phosphates and phenolic phosphites to cause an exothermic reaction, said phosphates and phosphites comprising a proportion of from 5 to 70% by weight of the monomer.

2. A process according to claim 1, wherein the phenolic phosphates and phenolic phosphites are of the group consisting of tri tolyl phosphate, tri (ethyl phenyl) phosphate, tri xylenyl phosphate, tris (nonyl phenyl) phosphite, and tri phenyl phosphite.

3. A process according to claim 2 wherein the process is accelerated by heating to above room temperatures.

4. A process according to claim 2 wherein the process is accelerated by the addition of aromatic thiols.

5. A process according to claim 4, wherein the accelerator is thio-$\beta$-naphthol.

6. A process according to claim 2 wherein the process is slowed by the addition of a material of the group consisting of an amine and a thio ketone.

References Cited

UNITED STATES PATENTS 2,560,251   7/1951   Sargent _____ 260—88.3

HARRY WONG, JR., *Primary Examiner.*

U.S. Cl. X.R.

260—30.6